(12) United States Patent
Takehisa et al.

(10) Patent No.: US 6,969,860 B1
(45) Date of Patent: Nov. 29, 2005

(54) PMMA-DOSIMETER

(75) Inventors: Masaaki Takehisa, Takasaki (JP); Yoshishige Sato, Fujioka (JP); Tuneo Sasuga, Takasaki (JP)

(73) Assignee: Radia Industry Co., Ltd., Gunma (JP)

(*) Notice: Subject to any disclaimer, the term of this patent is extended or adjusted under 35 U.S.C. 154(b) by 0 days.

(21) Appl. No.: 10/948,685

(22) Filed: Sep. 24, 2004

(30) Foreign Application Priority Data

Aug. 13, 2004 (JP) ............................. 2004/235996

(51) Int. Cl.$^7$ ............................................. G01J 1/00
(52) U.S. Cl. .................................................. 250/474.1
(58) Field of Search ........................ 250/474.1, 336.1

(56) References Cited

U.S. PATENT DOCUMENTS 4,205,988 A * 6/1980 Ozaki et al. ............... 430/340
4,454,421 A * 6/1984 Tanaka et al. ........... 250/336.1

OTHER PUBLICATIONS

T. Kojima et al., The Gamma-ray Response of Clear Polymethylmethacryate Dosimeter Radix RN15®, Appl. Radiat. Isot., vol. 43, No. 10, 1992, pp. 1197-1202.

* cited by examiner

*Primary Examiner*—David Porta
*Assistant Examiner*—Marcus Taningco
(74) *Attorney, Agent, or Firm*—Staas & Halsey LLP

(57) ABSTRACT

A PMMA dosimeter for ionizing radiation shows not only a broad dose measurement range but also sensitivity less depending upon temperature. PMMA having a glass transition point Tg higher than 120° C. is employed as substance sensitive to ionizing radiation such as gamma ray. This gives the PMMA dosimeter characteristics such that (1) absorbance changing rate (measurement light wavelength 320 nm) per 1 kGy at dose of 140 kGy under 25° C. condition is not less than 0.003 ABS/mm and (2) the maximum absorbance $ABS_{max}$ and the minimum absorbance $ABS_{min}$ at dose of 140 kGy under a temperature condition range from 10° C. to 50° C. meet a formula $ABS_{max}/ABS_{min} \leq 1.06$. PMMA dosimeters according to prior arts show characteristics such that sensitivity drops sharply in a dose range over 50 kGy and has a growing dependency upon temperature in a range over 25° C.

2 Claims, 4 Drawing Sheets

PMMA-DOSIMETER

FIELD OF INVENTION

The present invention relates to a dosimeter employing polymethylmethacrylate (PMMA) as substance sensitive to ionizing radiation such as gamma ray. Specifically, the present invention relates to arts for enabling a PMMA dosimeter to have an expanded measurement range and a reduced sensitivity dependency upon temperature.

Irradiation of ionizing radiation such as gamma ray is applied to broad usages including sterilization of medical or biological appliances, packing materials, feed for experimental animals or sundries, and usages other than sterilization, for example, crosslinking reactions, decomposition reactions or graft reactions of polymer, processing of semiconductors for property improvement, or radiation resistance tests.

Needless to say, it is important in every usage to control absorbed dose properly. PMMA dosimeters are known as dosimeters generally used for this purpose. Substance sensitive to ionizing radiations such as gamma ray employed in them is PMMA (polymethylmethacrylate; $(C_5H_8O_2)_n$). PMMA dosimeters utilize absorbance change (increasing) depending on absorbed dose for measuring absorbed dose.

Light wavelength usually employed for absorbance measurement falls in a range roughly from 300 nm to 320 nm in the case of a colorless and transparent PMMA dosimeter, and from 530 nm to 651 nm in the case of a dye-added PMMA dosimeter.

Although PMMA dosimeters are not expensive and shows good mechanical characteristics and mass-productivity, those of prior arts are subject to the following problems (1) and (2).

(1) Measurement range in which absorbed dose measurement is allowed to show a good sensitivity is narrow.

Prior art PMMA dosimeters have practical upper limits of measurement range are about 50 kGy (kirogrey). As described later, what prevents prior art PMMA dosimeters from having a heightened upper limit of measurement range is a sharp reduction in ratio of increase in absorbance with respect to increase in absorbed dose, which starts when absorbed dose exceeds about 50 kGy. In other words, characteristics curve showing absorbance changing depending on absorbed dose has a sharp gradient decrease starting at around absorbed dose of 50 kGy, resulting in an inevitable saturation phenomenon such that any more irradiation causes absorbance to vary little.

ISO/ASTM (2003), an international criterion in the field, shows two kinds of PMMA dosimeters. One of the two is a kind of PMMA dosimeter included in three kinds of PMMA dosimeters produced and sold by Harwell Dosimeter Co., Ltd. (United Kingdom), and the other is a kind of PMMA dosimeter produced and sold by Radia Industry Co.,Ltd. (Japan). Both the two kinds PMMA dosimeters have a nominal measurement range from 5 kGy to 50 kGy. If applied to sterilization of medical appliances, such conventional PMMA dosimeters are usable since absorbed dose to be measured ranges from about 25 kGy to about 50 kGy.

However, irradiation for usages such as sterilizing feed for experimental animals or bridging of polymer is generally required to exceed 50 kGy. In such cases, dosimeter exchange must be done on the way to the end of irradiation because total irradiation exceeds the upper limit of measurement range, and total absorbed dose must be calculated by adding up the obtained measured values.

Although absorbed dose exceeding a nominal measurement range can be estimated by applying extrapolation to a calibration curve, the estimated values are not admitted in formal reports of measurement results. Under the above-described background, it has been desired to develop a PMMA dosimeter that has an improved measurement range covering absorbed dose much exceeding 50 kGy.

(2) Sensitivity changes not a little depending on temperature under which irradiation is applied.

As described above, a fundamental problem of prior art PMMA dosimeters is "narrow measurement dose range". Another problem is that sensitivity changes strikingly depending on temperature. In particular, a serious drawback of prior arts is a fact such that sensitivity shows a large dependency upon temperature, as shown by examples later, under a temperature condition ranging from 10° C. to 50° C. which is usual condition in actual irradiation applications.

It is noted that description on characteristics of PMMA dosimeters is found in Appl. Radiat. Isot. Vol. 43, No. 10, pp. 1197–pp. 1202, 1992; "The Gamma-ray Response of Clear Polymethylmethacrylate Dosimeter".

DISCLOSURE OF INVENTION

An object of the present invention is to provide a PMMA dosimeter overcoming the above-described problems of prior arts. In other words, the present invention aims to provide a PMMA dosimeter which has a measurement range covering absorbed dose much exceeding 50 kGy and shows a small sensitivity dependency upon temperature, in particular, an approximately constant sensitivity under temperature ranging from 10° C. to 50° C. Another object of the present invention is to improve of dose measurement of ionizing radiation such as gamma ray and to heighten working efficiency by reducing frequency of dosimeter exchange.

As pointed out already, PMMA dosimeters according to prior arts show a growingly dull response of increase in absorbance to increase in absorbed dose in when absorbed dose exceeds about 50 kGy. The major reason why such a sensitivity saturation is caused is inferred as follows.

As known well, main chains in macromolecular structure are cut by ionizing radiation, reducing average molecular weight. This will give a major factor of the above dull response. In addition to such reduction in average molecular weight caused by main chain cutting, small molecule weight radicals or substances generated by radiolysis are accumulated within the PMMA dosimeter.

Such accumulation causes radicals, such as long chain radicals or methyl group radicals, generated around cutting points of main chains to have a heightened probability of being recombined, and activated molecules or atom groups involving optical absorption at around 320 nm vanish growingly when dose comes to about 30 kGy. This is an explanation on mechanism causing reduction in sensitivity.

The present inventors have studied on characteristics of PMMA materials which have been not employed in prior art PMMA dosimeters as substance sensitive to ionizing radiation in spite of being now available in order to find a PMMA material meeting the foresaid objects. The present invention is based on a novel and important knowledge obtained through the study.

That is, the present inventors have found a relation, which is to be regarded as decisive one, between glass transition point Tg and both (a) dose measurement range (measurable upper limit) and (b) sensitivity dependency upon temperature. According to the relation, PMMA having a glass transition point Tg higher than 120° C. shows a measurable dose upper limit largely exceeding 50 kGy as well as a small sensitivity dependency upon temperature. This fact supports the present invention.

It is noted that the present invention gives no specific upper limit to glass transition point Tg of PMMA employed in dosimeters. However, it is needless to say that PMMA dosimeters failing to meet the performance requirements defined in the latter half of claim 1 are removed from the scope of the present invention.

A PMMA dosimeter in accordance with the present invention employs polymethylmethacrylate as substance sensitive to ionizing radiation, wherein the polymethylmethacrylate has a glass transition point Tg higher than 120° C., thereby giving the PMMA dosimeter characteristics for Cobalt-60 gamma-rays such that absorbance changing rate with measurement light wavelength of 320 nm per 1 kGy at dose of 140 kGy under 25° C. condition is not less than 0.003 ABS/mm and the maximum absorbance $ABS_{max}$ and the minimum absorbance $ABS_{min}$ at dose of 140 kGy under a temperature condition range from 10° C. to 50° C. meet a formula $ABS_{max}/ABS_{min} \leq 1.06$.

PMMA dosimeters according to prior arts show characteristics such that sensitivity drops sharply in a dose range over 50 kGy and has a growing dependency upon temperature in a range over 25° C. The PMMA-dosimeter may be a plate-like dosimeter falling in a range from 1 mm to 3 mm in thickness.

The present invention enables the PMMA to be free from the above-described problems of prior arts. The PMMA dosimeter has a measurement range covering absorbed dose much exceeding 50 kGy and shows a small sensitivity dependency upon temperature, in particular, an approximately constant sensitivity under temperature ranging from 10° C. to 50° C. Thus the present invention improve reliability of dose measurement of ionizing radiation such as Co-60 gamma ray, heightening working efficiency by reducing frequency of dosimeter exchange.

BEST MODE FOR CARRYING OUT THE INVENTION

In the foresaid study, the present inventors obtained some samples of PMMA materials which have glass transition points Tg over 120° C. from Nitto Jushi Kogyo Co.,Ltd., having carried out tests for confirming glass transition point Tg and further studied applicability to PMMA dosimeters. The obtained PMMA materials are items of ID-codes W3-0.0,W4-0,W5-0 having a commercial name "Clarex" (Registered Trade Mark). Items representing the ID-codes W3-0,W4-0, W5-0 were adopted as Sample 1, Sample 2 and Sample 3, respectively.

In addition, Reference 1 to Reference 4 were prepared for comparison. Every Reference is made of a known PMMA material employed in a prior art PMMA dosimeter. Makers and commercial names of Sample 1 to Sample 3 and Reference 1 to Reference 4 are as follows,

- ● Sample 1=Nitto Jushi Kogyo Co.,Ltd.;Clarex (Registered Trade Mark) W3-0
- ● Sample 2=Nitto Jushi Kogyo Co.,Ltd.;Clarex (Registered Trade Mark) W4-0
- ● Sample 3=Nitto Jushi Kogyo Co.,Ltd.;Clarex (Registered Trade Mark) W5-0
- ○ Reference 1=Harwell Dosimeters Ltd.;Gammachrome (Registered Trade Mark) YR Batch 6
- ○ Reference 2=Harwell Dosimeters Ltd.;Amber (Registered Trade Mark) 3042 Batch N
- ○ Reference 3=Harwell Dosimeters Ltd.;Red (Registered Trade Mark) 4034 Batch GG
- ○ Reference 4' Radia Industry Co., Ltd.;Radix (Registered Trade Mark) RN-15 Batch 8

Glass transition points Tg of Samples 1 to 3 and References 1 ro 4 were measured, result of which are shown with outward appearance data in Table 1.

TABLE 1

| Sample/Reference | Tg (° C.) | Outward Appearance |
| --- | --- | --- |
| Sample 1 | 124.1 | Colorless and Transparent |
| Sample 2 | 128.5 | Colorless and Transparent |
| Sample 3 | 130.6 | Colorless and Transparent |
| Reference 1 | 116.9 | yellowish and Transparent |
| Reference 2 | 112.0 | orangish and Transparent |
| Reference 3 | 116.1 | red and Transparent |
| Reference 4 | 119.6 | Colorless and Transparent |

Performance Tests for comparing Samples 1 to 3 (present invention) with References 1 to 4 (prior arts) were carried out next. Samples 1 to 3) and References 1 to 4 were tested for "measurement range (measurable dose range)" and "temperature characteristics (sensitivity variation depending of temperature)".

Figure 1:
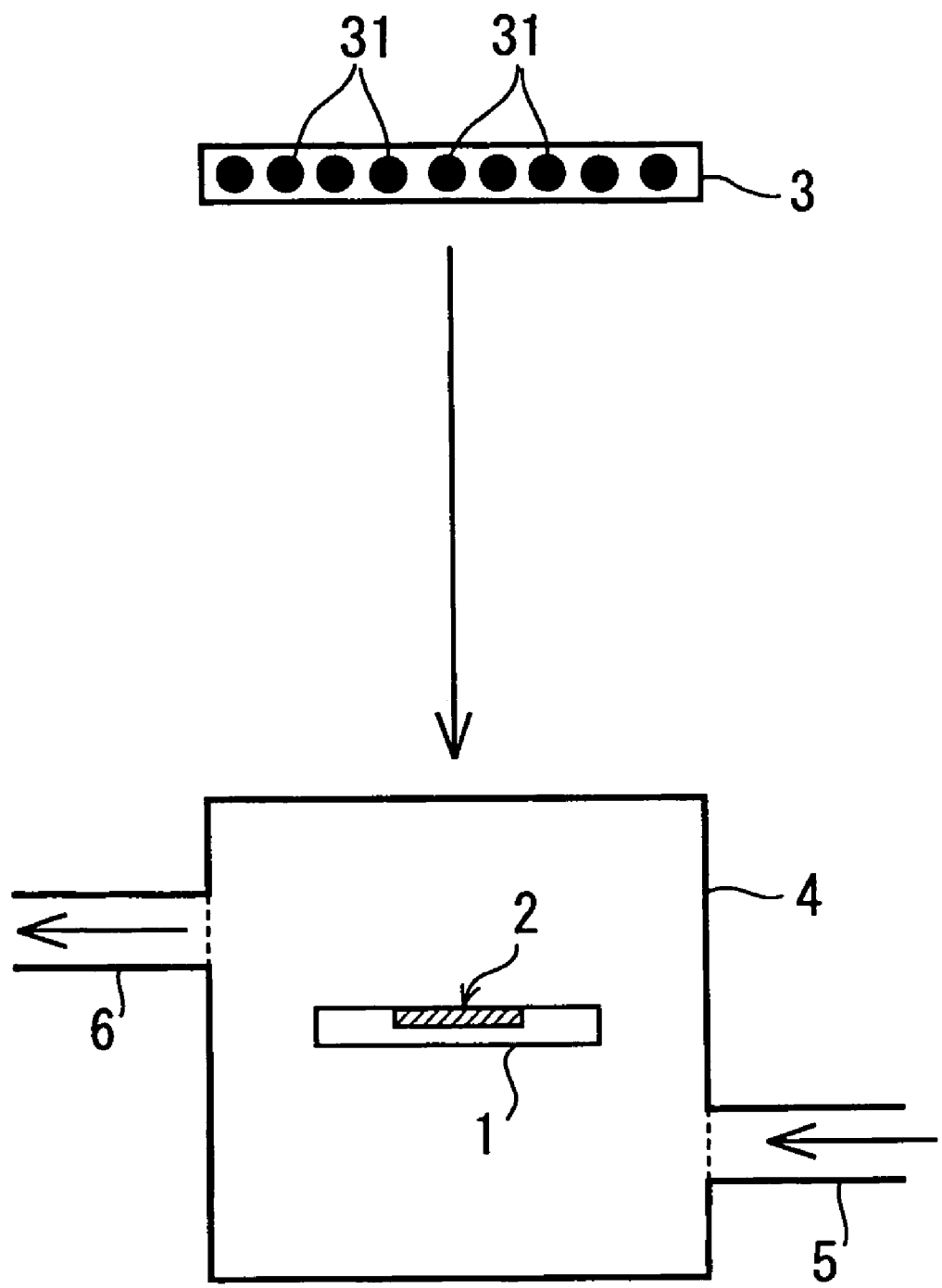
FIG. 1 is an outlined arrangement employed in irradiation tests for finding dose-absorbance characteristics of samples and references.

Nominal measurement ranges of References 1 to 4, which have been known in conventional uses, were confirmed by irradiation under 25° C. employing an arrangement as shown in FIG. 1. The arrangement was also employed for irradiating Samples 1 to 3. Plate-like samples 2 (References or Samples) were set on sample holder 1, which was then put in thermostatic chamber 4 for control temperature condition. Thermostatic chamber 4 containing sample holder 1 and samples 2 thereon was irradiated in an irradiation room. Thermostatic chamber 4 was supplied with temperature-controlled air from an air conditioner (not shown) outside of the irradiation room though suction duct 5. The air was returned to the air conditioner through outlet duct 6 to be sent again to thermostatic chamber 4. Such an air circulation kept thermostatic chamber 4 in a condition of constant temperature (set at the air conditioner).

Cobalt 60 was sealed in each of capsules 31 of radiation source 3. Distance from radiation source 3 to the PMMA samples was set at a predetermined constant value, for example, 1 m. The sample were 1.5 mm in thickness. It is noted that typical thickness employed in transparent-type PMMA dosimeters ranges about 1.4 mm to about 1.6 mm. Wavelength (center value) of light employed in absorbance measurements was 320 nm.

Absorbed dose per unit time was measured by a reliable dosimeter under the same geometry condition as that shown in FIG. 1 before Samples and References were irradiated, and then attenuation correction was applied according to a function of time when absorbed dose values of Samples and References were calculated after being irradiated. Attenuation correction was carried out based on well-known half value period data of cobalt 60. Nominal measurement ranges confirmed by measurements of References 1 to 4 are as follows.

☐ Reference 1; 0.1 kGy~3 kGy
☐ Reference 2; 1 kGy~30 kGy
☐ Reference 3; 5 kGy~50 kGy
☐ Reference 4; 5 kGy~50 kGy As described already, prior arts show upper limits of 50 kGy at highest and the above References give no exception. In addition, it should be noted that every Reference has a glass transition point Tg lower than 120° C. as shown in Table 1. Such relation between upper limit of measurement range and glass transition point is valid not only in the case of above examples, being generally applicable to other conventional PMMA cases.

To the contrary, each of Samples 1 to 3 has a glass transition point Tg over 120° C. as shown in Table 1. Samples 1 to 3 were checked for measurement range under a temperature condition of 25° C. and the arrangement shown in FIG. 1. As a result, every Sample gave indeed a glass transition point Tg much exceeding 50 kGy and proved that sensitivity was kept good in a measurement range extending to 140 kGy or 150 kGy.

Figure 2:
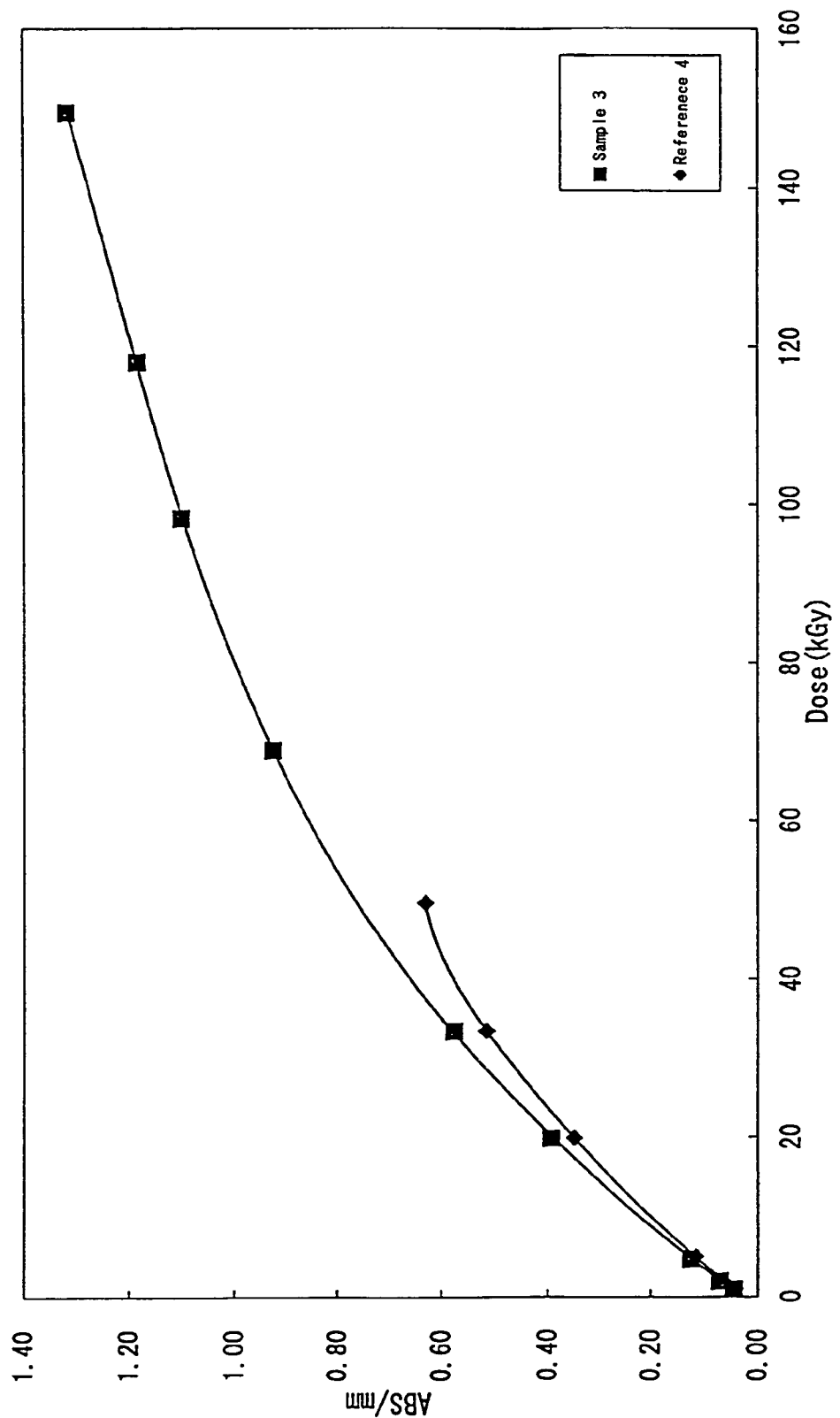
FIG. 2 is a graph showing dose-absorbance characteristics of Sample 3 and Reference 4 obtained under a temperature condition of 25° C.

FIG. 2 is a graph showing dose-absorbance characteristics of Sample 3 as a representative of Samples and Reference 4 as a representative of References. This measurement was carried out under a temperature condition of 25° C. and the arrangement shown in FIG. 1. In the graph, axis of abscissas indicates absorbed dose (kGy) and axis of ordinates indicates absorbance (ABS/mm). Measurement points of Sample 3 are indicated by ■ mark those of Reference 4 are indicated by ◇ mark.

The characteristic curve of Sample 3 was drawn according to polynomial (quartic expression) approximation such that optimum coefficients and constants were determined so that a quartic curve passes the measurement points of Sample 3.

In a similar manner, a characteristic curve of Reference 4 was drawn according to polynomial (quartic expression) approximation such that optimum coefficients and constants were determined so that a quartic curve passes the measurement points of Reference 4.

The following (1) to (5) are understood on the instance by comparing the characteristic curves with each other.

(1) The characteristic curve of Sample 3 has a gradually decreasing gradient from about 1 kGy to about 150 kGy, providing a gentle reduction in gradient. For instance, a remarkably large gradient is maintained in a region from about 140 kGy to about 150 kGy. Gradient at 140 kGy was calculated at 0.004. Gradients at 140 kGy calculated based on similar measurements carried out for Samples 1 and 2 were larger than 0.003, respectively.

(2) On the other hand, the characteristic curve of Reference 4 has remarkably sharp decreasing gradient from about 1 kGy to about 50 kGy. That is, the characteristic curve of Reference 4 shows an evidently sharper decrease in gradient according to increase in dose as compared with that of Sample 3. At dose exceeding 50 kGy a little, gradient of the characteristic curve of Reference 4 falls to a value (=about 0.004) which is provided by the characteristic curve of Sample 3 at about 140 kGy.

(3) Accordingly, the upper limit of measurement range of Sample 3 was estimated at abut 140 kGy based on the same criterion as that applied to Reference 4. This is a large value that none of PMMA dosimeters in accordance with prior arts can not expected at all.

(4) Viewing from sensitivity (gradient of the characteristic curve) in a dose region below 50 kGy, which is included in both measurement ranges of Sample 3 and Reference 4, Sample 3 is also superior to Reference 4. For instance, Sample 3 gives 0.014 at 30 kGy (under 25° C.) while Reference 4 gives 0.012 at 30 kGy (under 25° C.). The former value is larger than the latter value.

It is note that gradient at 30 kGy was calculated by averaging gradient in a region from 29.5 kGy to 30.5 kGy by applying the foresaid polynomial approximation.

(5) judging from the above results of comparison, Sample 3 is evidently superior to Reference 4 in measurement range size. Such difference is demonstrated by characteristic comparison between Sample 1 and Reference 4, or Sample 2 and Reference 4, as referred to already. It is also described already that each of References 1 hardly show a measurement range having an upper limit exceeding 50 kGy.

Next, results of comparison tests for sensitivity dependency upon temperature are described.

Figure 3:
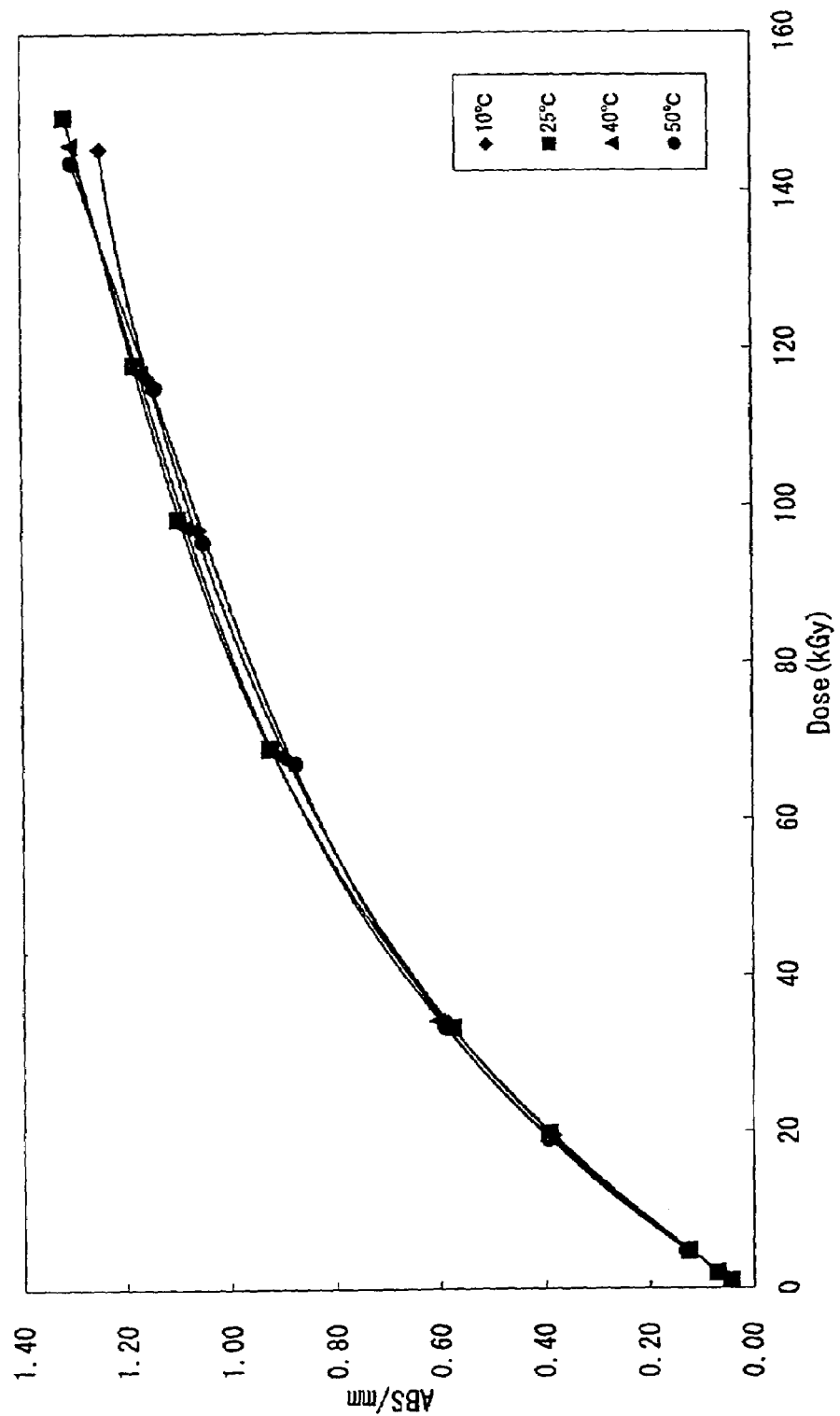
FIG. 3 is a graph showing dose-absorbance characteristics of Sample 3 obtained under temperature conditions of 10° C., 25° C., 40° C. and 50° C., respectively.

FIG. 3 is a graph showing dose-absorbance characteristics of Sample 3 obtained under four temperature conditions of 10° C., 25° C., 40° C. and 50', respectively. Irradiation for measurements was carried out under the arrangement shown in FIG. 1. In FIG. 3, the characteristic curve drawn under 25° C. is the same as that of Sample 3 shown in FIG. 2. In the graph shown in FIG. 3, axis of abscissas indicates absorbed dose (kGy) and axis of ordinates indicates absorbance (ABS/mm).

Measurement points of characteristic curves under 10° C., 25° C., 40° C. and 50° C. are indicated by ◇ mark, ■ mark, ▲ mark and ● mark. Each of the characteristic curves was drawn according to polynomial (quartic expression) approximation such that optimum coefficients and constants were determined so that a quartic curve passes the corresponding measurement points indicated by the corresponding mark.

Figure 4:
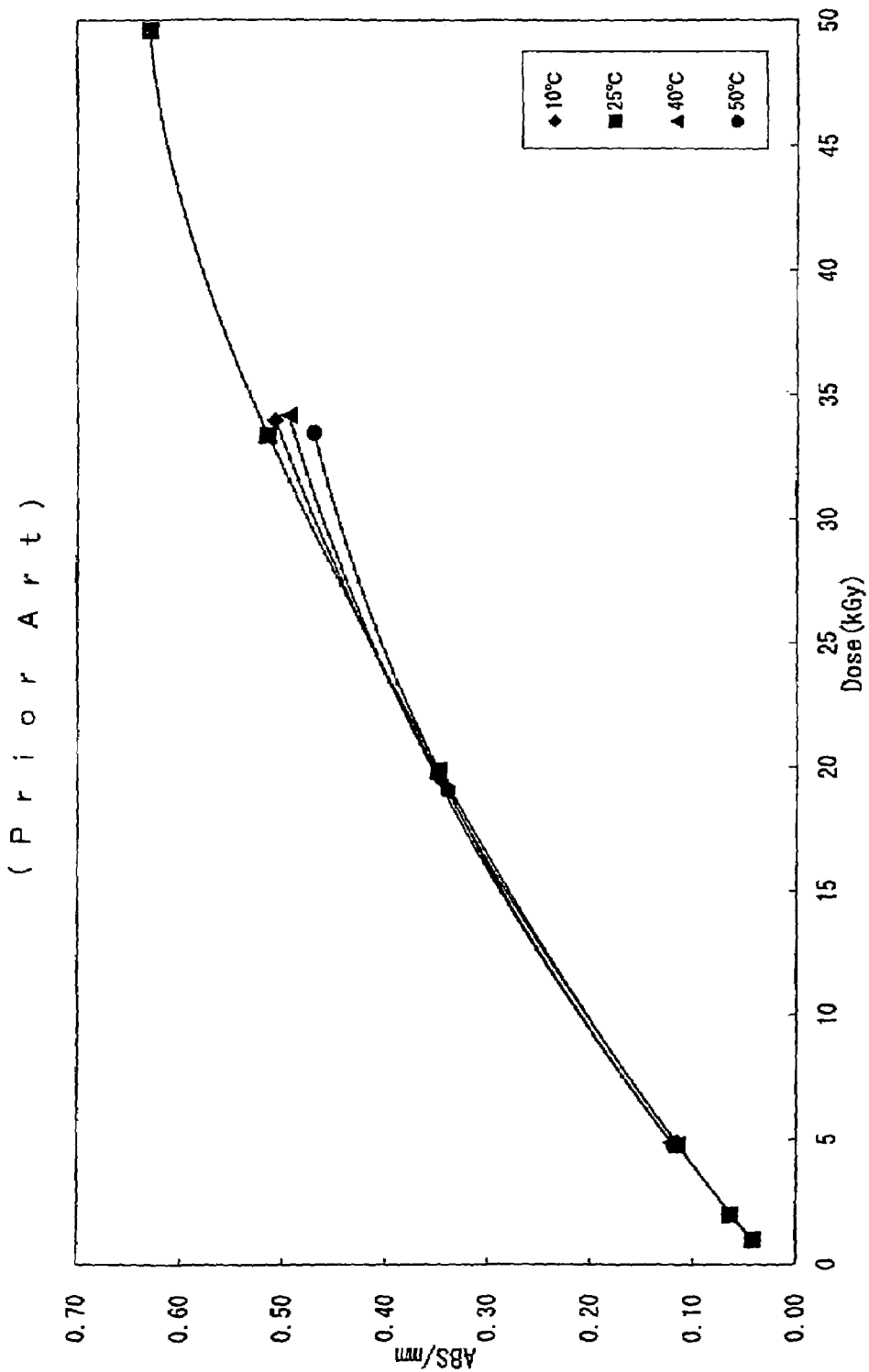
FIG. 4 is a graph showing dose-absorbance characteristics of Reference 4 obtained under temperature conditions of 10° C., 25° C., 40° C. and 50° C., respectively.

On the other hand, FIG. 4 is a graph illustrating dose-absorbance characteristics of Reference 4 obtained under four temperature conditions of 10° C., 25° C., 40° C. and 50° C., respectively. Irradiation for measurements was carried out under the arrangement shown in FIG. 1. In FIG. 4, the characteristic curve drawn under 25° C. is the same as that of Reference 4 shown in FIG. 2. In the graph shown in FIG. 4, axis of abscissas indicates absorbed dose (kGy) and axis of ordinates indicates absorbance (ABS/mm).

Measurement points of characteristic curves under 10° C., 25° C., 40° C. and 50° C. are indicated by ◇ mark, ■ mark, ▲ mark and ● mark. Each of the characteristic curves was drawn according to polynomial (quartic expression) approximation such that optimum coefficients and constants were determined so that a quartic curve passes the corresponding measurement points indicated by the corresponding mark.

The following (1) and (2) are understood on the instance by comparing the characteristic curves shown in FIGS. 3 and 4 with each other.

(1) The characteristic curves of Sample 3 drawn under 10° C., 25° C., 40° C. and 50° C. are approximately the same each other in a broad dose measurement region ranging from about 1 kGy to about 150 kGy. In other words, sensitivity changes only a little depending on temperature in the broad dose measurement region ranging from about 1 kGy to about 150 kGy.

For instance, calculating the ratio of the maximum absorbance $ABS_{max}$ to the minimum absorbance $ABS_{min}$ under a temperature condition range from 10° C. to 50° C., $ABS_{max}/ABS_{min}$ is 1.039 at dose of 140 kGy and 1.050 at dose of 30 kGy. Namely, the maximum variation percentage does not exceed 5% at both dose points. According to similar measurements carried out for Samples 1 and 2, the maximum variation percentage was not greater than 6% at 30 kGy.

(2) To the contrary, the characteristic curves of Reference 4 drawn under 10° C., 25° C., 40° C. and 50° C. disaccord with each other growingly from around 25 kGy. That is, if dose exceeds 25 kGy, sensitivity dependency upon temperature becomes large rapidly. It is noted that Reference 4 has a measurement range the upper limit of which is about 50 kGy as described already.

Corresponding to this, plotting under 25° C. terminates at 50 kGy and those under the other temperature conditions terminate at 35 kGy.

Calculating the ratio of the maximum absorbance $ABS_{max}$ to the minimum absorbance $ABS_{min}$ under a temperature condition range from 10° C. to 50° C., $ABS_{max}/ABS_{min}$ is 1.075 at dose of 30 kGy.

This value is remarkably greater than the corresponding value of Sample 3, 1,050. This demonstrates that Reference 4 tends to be much affected by temperature condition around 30 kGy.

Table 2 shows the values used for calculating the above ratios $ABS_{max}/ABS_{min}$, wherein the values were derived from polynomials approximately expressing the corresponding characteristic curves, respectively. In Table 2, marks (*) indicate being employed as $ABS_{min}$ and marks (**) indicate being employed as $ABS_{max}$.

TABLE 2

| Temperature | Sample 3 | | Reference 4 |
|---|---|---|---|
| Condition (° C.) | 140 kGy (ABS/mm) | 30 kGy (ABS/mm) | 30 kGy (ABS/mm) |
| 10 | (*) 1.232 | (*) 0.530 | 0.467 |
| 25 | 1.278 | 0.540 | (**) 0.475 |
| 40 | 1.278 | (**) 0.556 | 0.457 |
| 50 | (**) 1.279 | 0.554 | (*) 0.442 |

What is claimed is:

1. A PMMA dosimeter employing polymethylmethacrylate as substance sensitive to ionizing radiation, wherein said polymethylmethacrylate has a glass transition point Tg higher than 120° C., thereby giving the PMMA dosimeter characteristics for cobalt-60 ionizing radiation such that absorbance changing rate with measurement light wavelength of 320 nm per 1 kGy at dose of 140 kGy under 25° C. condition is not less than 0.003 ABS/mm and the maximum absorbance $ABS_{max}$ and the minimum absorbance $ABS_{min}$ at dose of 140 kGy under a temperature condition range from 10° C. to 50° C. meet a formula $ABS_{max}/ABS_{min} \leq 1.06$.

2. A PMMA-dosimeter in accordance with claim 1, wherein the PMMA-dosimeter is a plate-like dosimeter falling in a range from 1 mm to 3 mm in thickness.

* * * * *

UNITED STATES PATENT AND TRADEMARK OFFICE
CERTIFICATE OF CORRECTION

PATENT NO. : 6,969,860 B1
APPLICATION NO. : 10/948685
DATED : November 29, 2005
INVENTOR(S) : Masaaki Takehisa et al.

It is certified that error appears in the above-identified patent and that said Letters Patent is hereby corrected as shown below:

On the cover page (56):
Column 2, Other Publications, line 1-2, change "Polymethylmethacryate" to --Polymethylmethacrylate--.

In the drawings:
Fig. 2, change "♦ Referenece 4" to --♦ Reference 4--

In the Specification:

Column 3, line 38, change "DRAWING" to --DRAWINGS--

Column 3, line 44, after 25°C. insert --;--

Column 3, line 64, change "W3-0.0 to W3-0,--

Column 4, line 18, change " Reference 4' " to --Reference 4=--

Column 4, line 21, change "ro" to --to--

Column 5, line 36, change "◊ mark." to --♦ mark.--

Column 5, line 67, change "abut" to --about--

Column 6, line 14, change "judging" to --Judging--

Column 6, line 25, change "50'," to --50°C.,--

Column 6, line 33, change "◊ mark," to --♦ mark,--

Column 6, line 50, change "◊ mark," to --♦ mark,--

UNITED STATES PATENT AND TRADEMARK OFFICE
CERTIFICATE OF CORRECTION

PATENT NO. : 6,969,860 B1
APPLICATION NO. : 10/948685
DATED : November 29, 2005
INVENTOR(S) : Masaaki Takehisa et al.

It is certified that error appears in the above-identified patent and that said Letters Patent is hereby corrected as shown below:

Column 8, lines 12-21 Table 2, delete "Table 2" second occurrence

Signed and Sealed this

First Day of August, 2006

JON W. DUDAS
*Director of the United States Patent and Trademark Office*